Nov. 24, 1970 H. E. KIMBLE ET AL 3,542,524
OXYGEN GENERATING APPARATUS FOR AQUARIUMS AND
OTHER OXYGEN REQUIREMENT SYSTEMS
Filed Oct. 10, 1967 2 Sheets-Sheet 1

INVENTORS.
PAUL W. REINHARDT
HARRY E. KIMBLE

BY Colton & Stone

ATTORNEYS.

INVENTORS.
PAUL W. REINHARDT
HARRY E. KIMBLE 3,542,524
OXYGEN GENERATING APPARATUS FOR AQUARIUMS AND OTHER OXYGEN REQUIREMENT SYSTEMS
Harry E. Kimble, 2101 Juniper Road, Knoxville, Tenn. 37912, and Paul W. Reinhardt, Rte. 3, Box 92A, Kingston, Tenn. 37763
Filed Oct. 10, 1967, Ser. No. 674,316
Int. Cl. B01j 7/02; B65d 47/00
U.S. Cl. 23—282
13 Claims

ABSTRACT OF THE DISCLOSURE

A hydrogen peroxide decomposition oxygen generating apparatus which may be submerged in a liquid such as water to permit egress of oxygen therefrom while precluding ingress of liquid thereinto without the use of valves or the like. This is made possible by the employment of a water-impervious, oxygen-pervious material interposed in the oxygen discharge passage.

A second form of the invention is directed to an infinitely variable control for a hydrogen peroxide decomposition oxygen generator.

Both forms of the invention employ a highly porous catalyst in contact with the hydrogen peroxide to catalyze the following reaction:

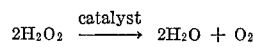

$$2H_2O_2 \xrightarrow{catalyst} 2H_2O + O_2$$

BACKGROUND OF THE INVENTION

This invention relates to an improved apparatus for the generation of oxygen by the decomposition of hydrogen peroxide. The invention finds application in a large variety of systems requiring a compact, lightweight oxygen generator, among which are the aeration of water in aquariums and minnow buckets, the supercharging of small engines, hospital or emergency oxygen tent usage and as a safe supply for oxygen masks since pressure reducers are not required. Because of its simplicity and lightweight construction, the oxygen generator of this invention is particularly suitable for spacecraft usage.

The practice of bubbling air through water to replenish the oxygen supply for fish and minnows is well known. The most common method used for this purpose employs a mechanical pump, an electric motor, and a source of electric current rendering it unsuitable for use with many types of portable apparatus, such as minnow buckets.

Another well known means of providing a source of oxygen is by storing the same in pressure tanks for subsequent use. Due to the large pressures necessarily involved in storing any appreciable quantity of oxygen, heavy steel tanks are required which are both cumbersome and relatively expensive. Moreover, the storage of oxygen under high pressure involves some danger, requires the use of a pressure reducer and regulator where low pressure applications are involved, and necessitates periodic recharging of the tank in which the oxygen is stored.

SUMMARY OF THE INVENTION

Among the many uses contemplated, oxygen generators embodying the present invention may be used to supercharge small gasoline engines, such as model airplane engines and for starting diesel engines.

It is among the objects of this invention to make available a supply of oxygen for use in aquariums and minnow buckets which does not depend upon the use of pumps or pressure storage and does not require an external power supply; to provide an extremely simple and compact oxygen generating unit which is safe and reliable in operation and requires a minimum of attention; to provide an oxygen generator which may be placed directly in a receptacle such as an aquarium or minnow bucket without sacrificing portability; to provide an oxygen supply having an infinitely variable flow rate control means utilizing only a single moving part; to provide an oxygen generator whose oxygen generation rate within the generator is automatically controlled as a function of flow rate from the generator; to provide an oxygen generator which may be directly submerged in the water to be aerated, including means freely permitting the oxygen to pass from the generator to the surrounding water while precluding entry of the water into the generator; and to provide a portable, lightweight oxygen generating unit which is extremely useful for a number of applications where the characteristics of conventional generating or storage units render their use impractical.

BRIEF DESCRIPTION OF THE DRAWINGS

The manner in which the objects of the invention are realized will become more readily apparent from the following description and the accompanying drawings, wherein.

DESCRIPTION OF THE PREFERRED EMBODIMENTS

It is well known that hydrogen peroxide decomposes in the presence of a decomposition catalyst to yield water and oxygen in accordance with the following equation:

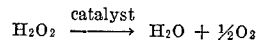

$$H_2O_2 \xrightarrow{catalyst} H_2O + \tfrac{1}{2}O_2$$

It has been found that the reaction proceeds more readily when the catalyst chosen is one having a high ratio of actual surface to apparent surface, or, in other words, where it is quite porous or where it possesses a high degree canalization as exemplified by activated charcoal or platinized platinum. Other suitable catalysts having the required characteristics are alloys such as Wood's metal and type metal corroded by etching with nitric acid.

Figure 1:
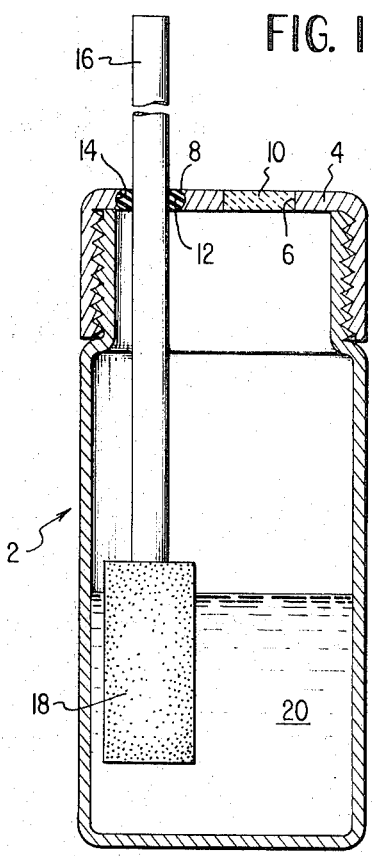
FIG. 1 is a vertical section of one embodiment of an oxygen generator having a variable flow rate control in accordance with the invention.

A first embodiment of the novel oxygen generator provided with a variable flow rate control is shown in FIG. 1 as comprising a suitable enclosed container 2 including a removable top 4. The top 4 is provided with a pair of openings 6 and 8 extending therethrough. The opening 6 constitutes the oxygen delivery port and, in the embodiment shown in FIG. 1, is closed by a plug of material 10 that is pervious to oxygen but impervious to water. This oxygen-pervious water-impervious material may be a frit, a porous ceramic or other rigid porous material having a pore size which will permit the passage of oxygen molecules while precluding the passage of water molecules. A flexible O-ring or other annular seal 12 is suitably secured within the opening 8, such as by being received in a concavity 14 formed in the peripheral wall of the opening. An elongated control rod 16 having a diameter slightly greater than the inner diameter of the seal 12 extends through the seal in slidable fluid tight sealing engagement therewith. Affixed to the end of the control rod extending into the container 2 is a highly porous body of a hydrogen peroxide decomposition catalyst 18 which may, for example, be activated charcoal. When the container 2 is partially filled with a solution of hydrogen peroxide 20 and the decomposition catalyst is immersed therein, as shown in FIG. 1, decomposition of the hydrogen peroxide with the concomitant production of oxygen will proceed at a rate which is a function of the surface area of contact between the hydrogen peroxide solution and the decomposition catalyst. Accordingly, the rate of oxygen production by the generator may be controlled by manipulating the upper end of the control rod 16 to bring a greater or lesser portion of the catalyst 18 in contact with the solution 20. It will be appreciated that for this purpose, the length of the control rod is such as to extend above the surface 21 of a body of water 22 to be aerated such as shown in FIG. 2.

Figure 2:
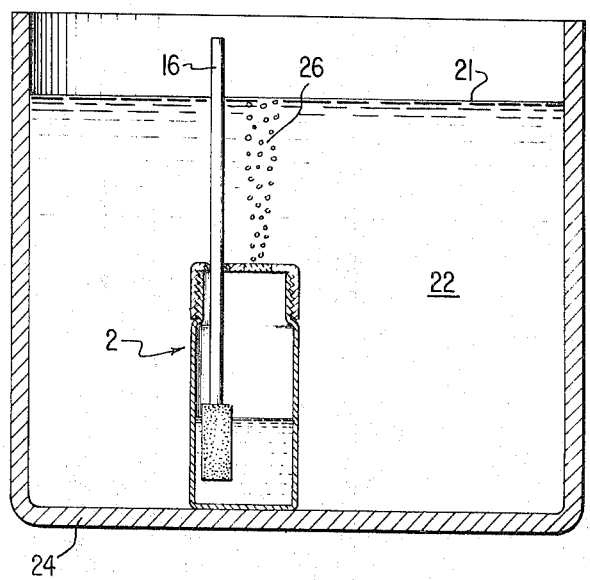
FIG. 2 is a sectional view of a receptacle, such as an aquarium or a minnow bucket, containing water to be aerated, and showing one embodiment of the novel oxygen generator positioned therein.

In use, the oxygen generator of FIG. 1 is submerged in a body of water 22 contained within a receptacle 24 as illustrated in FIG. 2. The receptacle 24 containing the water to be aerated may be an aquarium or a minnow bucket and the fact that the rate of oxygen generation may be accurately controlled by manipulating control rod 16 makes the generator susceptible of usage in receptacles containing varying volumes of water. For example, by insertion of the control rod into the container 2 to that extent shown in FIG. 2 wherein the greater portion of the decomposition catalyst is in contact with the solution, an amount of oxygen sufficient to aerate a large aquarium will be generated. The same generator may also be used in a smaller aquarium or a minnow bucket merely by sliding the control rod 16 upwardly through the opening 8 to decrease the contact surface area between the catalyst and solution to thereby decrease the rate at which the decomposition reaction will proceed. The oxygen produced within container 2 escapes through the porous plug 10 as illustrated at 26 to aerate the body of water in which the generator is submerged. The surrounding water cannot enter container 2 because of the selective porosity of plug 10 and the sealing engagement between seal 12 and rod 16.

It is, of course, obvious that when any other factor affecting the rate of the decomposition reaction such as the concentration of hydrogen peroxide, the degree of canalization of the catalyst, temperature, etc., is varied, the control rod 16 may be manipulated to maintain the desired reaction rate.

Figure 3:
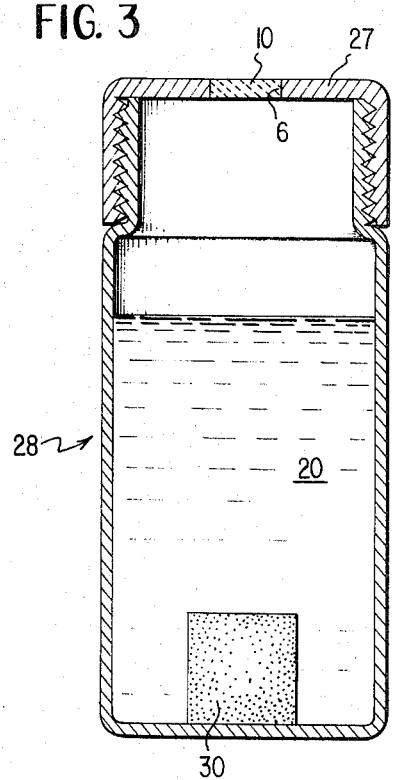
FIG. 3 is a vertical sectional view of a second embodiment of the oxygen generator.

A second embodiment of the novel oxygen generator is illustrated in FIG. 3 and differs from the generator shown in FIG. 1 in that a variable flow rate control means is not provided. Thus, for use in a receptacle containing a fixed volume of water to be aerated, the top 27 of container 28 may be provided with a single opening 6 closed by the oxygen-pervious water-impervious plug 10.

In use, container 28 is partially filled with a solution of hydrogen peroxide 20 in contact with a suitable decomposition catalyst 30 and submerged in a body of water to be aerated in the manner explained with reference to FIG. 2.

Figure 4:
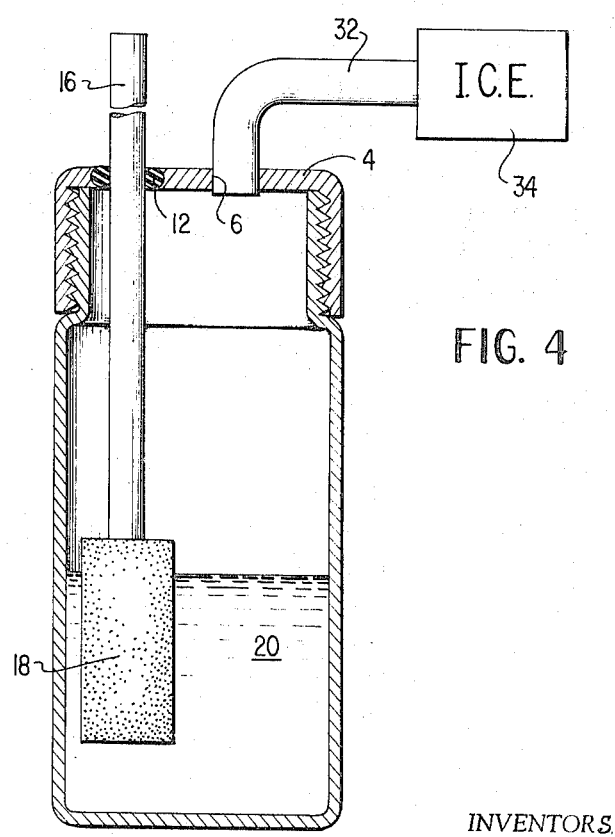
FIG. 4 illustrates the use of one form of the generator to supply oxygen to an internal combustion engine or other point of use.

In FIG. 4 is illustrated a usage of the variable flow rate generator similar to that of FIG. 1 but with the plug removed from oxygen delivery port 6. A conduit 32 is connected to the port 6 and supplies oxygen from the generator to an internal combustion engine 34 or other point of use.

The engine 34 may be one of the type wherein a portable source of oxygen is desirable but the cumbersome nature of conventional generating or storage units make their use impractical, such as in connection with model airplane engines used in competition where the oxygen generator may be used as a supercharger. The slidable sealing engagement between seal 12 and control rod 16 permits an accurate control of the oxygen flow rate to the engine 34 as explained in connection with the embodiments of FIG. 1.

Figure 5:
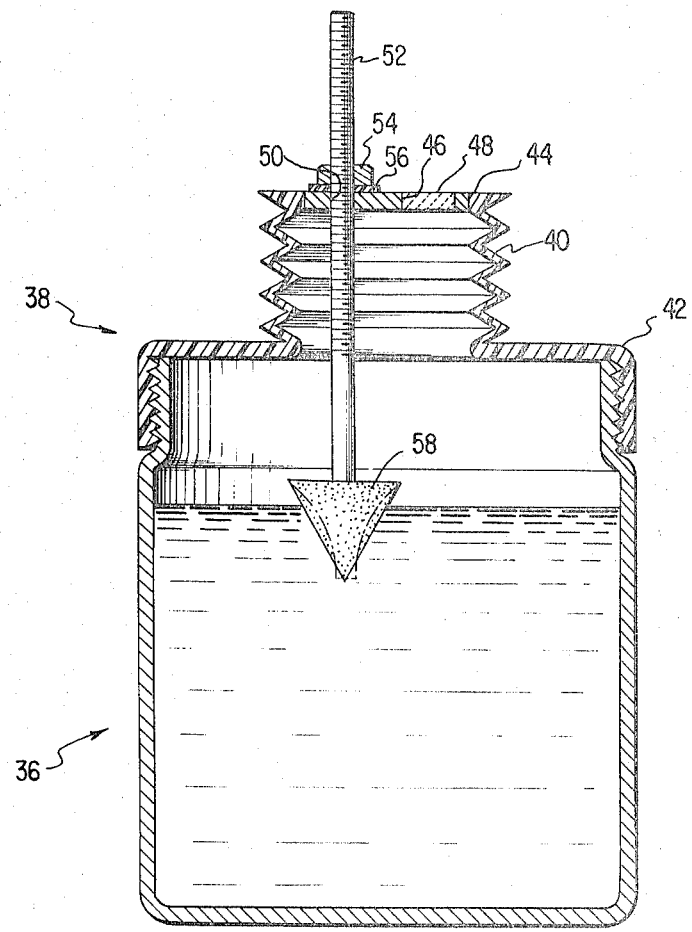
FIG. 5 is a vertical section of a third embodiment of the invention incorporating both variable generation and flow rates.

FIG. 5 illustrates a further embodiment of the invention which is similar to the generator shown in FIG. 1 but which incorporates a screw threaded control rod adjusting means and a modified top or closure member which is responsive to internal pressures within the container to vary the rate of oxygen generation.

The container 36 of FIG. 5 includes a modified closure member 38 whose neck portion is in the form of a flexible bellows 40 integral with or suitably secured to the screw threaded lower portion 42 and top portion 44. Oxygen delivery opening 46, formed in top portion 44 and including oxygen-pervious water-impervious member 48 is similar to that shown in FIG. 1 while the control rod opening consists of a screw threaded bore 50 receiving a similarly threaded control rod 52 suitably secured in adjusted position by lock nut 54 bearing against seal 56.

In some instances it may be desirable to provide an oxygen generator whose generation rate may be caused to vary in a known manner such as by producing an exponential increase in generation rate as a function of linear movement of the control rod. Such controlled generation may be effected by providing a desired cross-sectional configuration of the catalyst 58 secured to control rod 52. The generally triangular solid and phantom line illustrations of FIG. 5 show alternative configurations which catalyst 58 may assume. Thus, in the catalyst configuration which may be chosen for FIG. 5, it will be appreciated that a plot of oxygen generation and control rod movement need not involve a straight line relationship. Bellows 40 has sufficient flexibility to be responsive to a wide range of pressures within container 36 and return to its initial unstressed condition. As the rate of oxygen generation within the container exceeds the flow rate through member 48, thus creating a pressure differential across the bellows, the same expands carrying with it control rod 52 and catalyst 58 to decrease the rate of oxygen generation as will be obvious from an inspection of FIG. 5. One of the purposes of this construction is to insure that oxygen generation and flow rates are matched to preclude the build-up of excessive pressures within the generator.

Thus it will be seen that the objects of the invention have been carried out in the construction of a lightweight, compact and inexpensive generator making available large volumes of oxygen from a relatively small volume low pressure unit.

What is claimed is:

1. Oxygen generating apparatus comprising, a container including a removable closure, said container being partially filled with an oxygen containing decomposable solution, a decomposition catalyst in contact with said solution, and at least a portion of said container being formed of an oxygen-pervious water-impervious material.

2. Oxygen generating apparatus as defined in claim 1 in combination with a receptacle containing a body of water to be aerated, and said oxygen generating apparatus being submerged in said body of water whereby oxygen generated within the container may pass through said material to aerate the body of water and the water is precluded from entering the container.

3. The invention as defined in claim 2 wherein the receptacle is an aquarium.

4. The invention is defined in claim 2 wherein the receptacle is a minnow bucket.

5. Oxygen generating apparatus comprising, a container adapted to be partially filled to a desired filling level with a solution of hydrogen peroxide, said container including means positioned above said level defining a passage for the flow of oxygen therefrom, an oxygen-pervious water impervious plug sealingly interposed in said passage, a hydrogen peroxide decomposition catalyst within said container, and means interconnecting said container and said catalyst for selective positioning of the catalyst within the container whereby the contact surface area between the catalyst and a solution of hydrogen peroxide may be accurately controlled.

6. The invention as defined in claim 5 wherein said catalyst is generally triangular shaped in cross-section and connected to said last named means adjacent the base portion thereof.

7. The invention as defined in claim 5 wherein said second named means includes a screw threaded control rod threadedly engaged with said container.

8. The invention as defined in claim 7 wherein said container includes a flexible peripheral wall portion above the hydrogen peroxide filling level, (an oxygen-pervious water-impervious plug sealingly interposed in said passage,) and said control rod being engaged with said peripheral wall portion of said container above said filling level whereby upon an oxygen generation rate exceeding the flow rate of said plug excess pressure within the container expands said flexible wall to vary the position of the catalyst relative to the filling level to maintain proportional generation and flow rates.

9. The invention as defined in claim 8 wherein said flexible peripheral wall portion is a bellows.

10. A controlled flow oxygen generating apparatus comprising, an enclosed container including a removable closure for the introduction of a hydrogen peroxide solution therein, a first opening constituting an oxygen delivery port in said closure, an oxygen-pervious water-impervious plug closing said port, a second opening in said closure, an annular seal fixed within said second opening, an elongated control rod extending through said second opening into said container and frictionally and sealingly engaged by said seal intermediate the ends thereof to form a fluid tight seal between the control rod and the second opening, and a hydrogen peroxide decomposition catalyst fixed to that end of said control rod extending into the container, whereby the other end of the control rod may be manipulated to vary the degree of submergence of the catalyst within the solution to thereby control the rate of oxygen flow through said port.

11. The apparatus as defined in claim 10 wherein said container is at least partially filled with a solution of hydrogen peroxide.

12. A controlled flow oxygen generating apparatus as defined in claim 11 in combination with a receptacle containing a body of water to be aerated, and said oxygen generating apparatus being submerged in said body of water whereby oxygen generated within the container may pass through said plug while the plug precludes entry of water into the apparatus.

13. The invention as defined in claim 12 wherein said other end of said control rod extends above the surface of said body of water.

References Cited

UNITED STATES PATENTS

| | | | |
|---|---|---|---|
| 113,619 | 4/1871 | Boldemann | 23—281 |
| 645,545 | 3/1900 | Blackie | 23—281 |
| 705,570 | 7/1902 | Feldkamp | 23—282 |
| 978,641 | 12/1910 | Poe | 23—282 |
| 2,245,495 | 6/1941 | Pemble. | |
| 2,541,838 | 2/1951 | Shardlow. | |
| 2,912,018 | 11/1959 | Leech | 23—282 XR |
| 3,168,887 | 2/1965 | Bodell | 119—3 |
| 3,332,746 | 7/1967 | Claff et al. | 23—258.5 |
| 3,478,460 | 11/1969 | Kimble et al. | 43—4.5 |

MORRIS O. WOLK, Primary Examiner

B. S. RICHMAN, Assistant Examiner

U.S. Cl. X.R.

23—281, 288; 43—56; 119—5; 206—84; 261—122

UNITED STATES PATENT OFFICE
CERTIFICATE OF CORRECTION

Patent No. 3,542,524           Dated November 24, 1970

Inventor(s) H. E. Kimble et al

It is certified that error appears in the above-identified patent and that said Letters Patent are hereby corrected as shown below:

Column 1, line 5: Change "2101 Juniper" to --2109 Juniper--

Claim 8, lines 13-15: Delete "(an oxygen-pervious water-impervious plug sealingly interposed in said passage,)".

SIGNED AND SEALED
MAR 9 1971

(SEAL)
Attest:

Edward M. Fletcher, Jr.
Attesting Officer

WILLIAM E. SCHUYLER,
Commissioner of Patents